(12) United States Patent
Wang et al.

(10) Patent No.: US 10,789,519 B1
(45) Date of Patent: Sep. 29, 2020

(54) SCANNING INTERFACE DISPLAY

(71) Applicant: Alibaba Group Holding Limited, George Town (KY)

(72) Inventors: Xin Wang, Hangzhou (CN); Hongwei Luo, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/809,809

(22) Filed: Mar. 5, 2020

Related U.S. Application Data

(63) Continuation of application No. PCT/CN2020/071696, filed on Jan. 13, 2020.

(30) Foreign Application Priority Data

May 24, 2019 (CN) .......................... 2019 1 0437285

(51) Int. Cl.
*G06K 19/06* (2006.01)
*G06K 9/00* (2006.01)
*G06Q 20/32* (2012.01)

(52) U.S. Cl.
CPC ... *G06K 19/06037* (2013.01); *G06K 9/00671* (2013.01); *G06K 9/00973* (2013.01); *G06K 19/06046* (2013.01); *G06Q 20/32* (2013.01)

(58) Field of Classification Search
None
See application file for complete search history.

(56) References Cited

U.S. PATENT DOCUMENTS

| 7,181,066 | B1 | 2/2007 | Wagman et al. |
| 9,081,479 | B1 * | 7/2015 | Fram ..................... G06F 3/0236 |
| 2009/0285444 | A1 * | 11/2009 | Erol ..................... G06F 16/5846 |
| | | | 382/100 |
| 2013/0043302 | A1 * | 2/2013 | Powlen .................. G06Q 50/01 |
| | | | 235/375 |
| 2015/0009152 | A1 * | 1/2015 | Tang ..................... G06F 3/0484 |
| | | | 345/173 |

FOREIGN PATENT DOCUMENTS

| CN | 103218595 | 7/2013 |
| CN | 104123520 | 10/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Matthew Ell
(74) *Attorney, Agent, or Firm* — Fish & Richardson P.C.

(57) ABSTRACT

A computer-implemented method includes: obtaining, by an application client executing on a terminal, a display request; and controlling, based on the display request, a display screen of the terminal to simultaneously display a scanning region and a first identification code in an interface, in which the first identification code stores information corresponding to a user of the terminal, in which the scanning region displays a second identification code scanned by a camera of the terminal, and in which the second identification code is usable by the terminal to perform operations based on the second identification code.

15 Claims, 5 Drawing Sheets

(56) References Cited

FOREIGN PATENT DOCUMENTS

| CN | 104281830 | 1/2015 |
|---|---|---|
| CN | 106408290 | 2/2017 |
| CN | 106845311 | 6/2017 |
| CN | 107122693 | 9/2017 |
| CN | 107203878 | 9/2017 |
| CN | 108376335 | 8/2018 |
| CN | 108491240 | 9/2018 |
| CN | 109145676 | 1/2019 |
| CN | 110262710 | 9/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071696, dated Apr. 13, 2020, 17 pages (with machine translation).

* cited by examiner

SCANNING INTERFACE DISPLAY

CROSS-REFERENCE TO RELATED APPLICATIONS

This application is a continuation of PCT Application No. PCT/CN2020/071696, filed on Jan. 13, 2020, which claims priority to Chinese Patent Application No. 201910437285.8, filed on May 24, 2019, and each application is hereby incorporated by reference in its entirety.

TECHNICAL FIELD

The present disclosure relates to the field of computer technologies, and in particular, to methods, apparatuses, and devices for displaying an interactive interface.

BACKGROUND

In the existing technology, with wide application of two-dimensional codes, in addition to a payment scenario, two-dimensional codes are used in scenarios such as adding friends, downloading APPs, and user login to improve user convenience. However, in a specific application scenario, sometimes a user needs to display a two-dimensional code on a terminal for being scanned by a merchant or another user, and sometimes a user needs to scan a two-dimensional code provided by a merchant or another user.

SUMMARY

In view of this, implementations of the present application provide methods, apparatuses, and devices for displaying an interactive interface, to improve operation convenience of users.

To resolve the previous technical problem, the implementations of the present specification provides the following solutions:

An implementation of the present specification provides a method for displaying an interactive interface, including: obtaining an interactive interface display request that is submitted by a user and sent by a terminal; and controlling, based on the display request, a display screen of the terminal to display a scanning box and a first identification code on a same interface, where the scanning box is used to display a second identification code scanned by a camera of the terminal, and the first identification code is used to store information about the user.

An implementation of the present specification provides an apparatus for displaying an interactive interface, including: a display request acquisition module, configured to obtain an interactive interface display request that is submitted by a user and sent by a terminal; and a display module, configured to control, based on the display request, a display screen of the terminal to display a scanning box and a first identification code on a same interface, where the scanning box is used to display a second identification code scanned by a camera of the terminal, and the first identification code is used to store information about the user.

An implementation of the present specification provides a device for displaying an interactive interface, including: at least one processor, and a memory communicatively connected to the at least one processor, where the memory stores instructions that can be executed by the at least one processor, and the instructions are executed by the at least one processor to enable the at least one processor to: obtain an interactive interface display request that is submitted by a user and sent by a terminal; and control, based on the display request, a display screen of the terminal to display a scanning box and a first identification code on a same interface, where the scanning box is used to display a second identification code scanned by a camera of the terminal, and the first identification code is used to store information about the user.

At least one technical solution provided in the implementations of the present specification can achieve the following beneficial effects:

According to the method for displaying an interactive interface provided in the implementations of the present specification, a scanning box and a first identification code can be displayed on a same interface based on a display request of a user. Therefore, a display interface generated by using the method provided in the implementations of the present specification can realize that after a user clicks to invoke a same interface, the interface not only can be used as a scanning device to identify another identification code, but also can be used as a display interface to display an identification code for being scanned and identified by another device. The method provided in the implementations of the present specification integrates the scanning mode and the scanned mode to form an integrated mode, which can support subsequent operations in the two modes without prior judgment or selection by the user, and can greatly improve operation convenience of users in a scenario in which an identification code is used.

BRIEF DESCRIPTION OF DRAWINGS

The accompanying drawings described here are intended to provide a further understanding of the present application and constitute a part of the present application. The example implementations of the present application and the descriptions thereof are intended to explain the present application and do not constitute an undue limitation on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations of the present application and corresponding accompanying drawings. Clearly, the described implementations are only some rather than all of the implementations of the present application. All other implementations obtained by a person of ordinary skill in the art based on the implementations of the present application without creative efforts shall fall within the protection scope of the present application.

The following describes in detail the solutions provided in the implementations of the present specification with reference to the accompanying drawings.

Scanning: A user terminal is used as a code scanning device to scan a one-dimensional code or a two-dimensional code, to perform operations such as payment, adding friends, downloading APPs, or user login.

Scanned: A user terminal is used as a display tool to display a one-dimensional code or a two-dimensional code for being scanned by other scanning devices, to perform operations such as payment, adding friends, downloading APPs, or user login.

From a point of view of a user, a difference between "scanning" and "scanned" is whether the terminal used by the user is used as a scanning device or a scanned device. The payment scenario is as an example. In the "scanning" mode, a terminal APP invokes a scanning interface, and the user needs to align the scan positioning box to a to-be-scanned identification code to complete scanning. In the "scanned" mode, a terminal APP invokes an identification code interface of the user and displays the interface to a scanning device of the opposite party for scanning.

However, because of the difference between "scanning" and "scanned", a user usually needs to click and select different APP functions based on a specific mode. If the selection made by the user is incorrect, the user needs to make reselection, which degrades the user experience.

To resolve the foregoing problem, an implementation of the present specification provides a method for implementing both the functions in the "scanning" mode and the "scanned" mode on a display interface, so that the user does not need to select the functions based on a specific mode, thereby improving the user experience and saving time.

Figure 1:
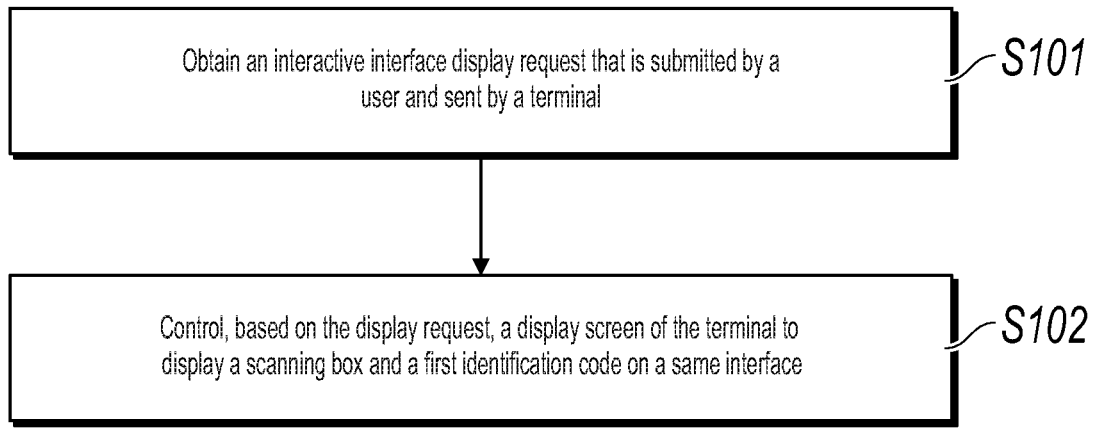
FIG. 1 is a schematic flowchart illustrating a method for displaying an interactive interface, according to an implementation of the present specification.

FIG. 1 is a schematic flowchart illustrating a method for displaying an interactive interface, according to an implementation of the present specification. From a point of view of a program, a process can be executed by a program or an application client that is attached to an application server. From the point of view of the program, a process can be executed by an application client attached to the terminal used by the first user, for example, a client of a product leasing application, a client of a payment application, or a client of an instant messaging application. The terminal can be a mobile phone, a tablet computer, a smartwatch, etc. In addition, a third-party application client can also assist in executing the process.

As shown in FIG. 1, the method can include the following steps.

Step S101: Obtain an interactive interface display request that is submitted by a user and sent by a terminal.

In this implementation of the present specification, interactive interfaces include the interfaces invoked in the operations performed in the "scanning" mode and the "scanned" mode. The interface can be an interface for the user to perform operations such as making payment, adding friends, downloading APPs, and user login, or an interface for recommending a product.

In this implementation of the present specification, the user may directly click a button in the APP to trigger the display request; or the user inputs the display request by voice, and the server identifies the user's request based on the voice.

In this implementation of the present specification, the display request may correspond to different content in different application scenarios. In a payment scenario, the display request can include a payment account and a payment amount. In a social scenario, the display request can include a user name.

Step S102: Control, based on the display request, a display screen of the terminal to display a scanning box and a first identification code on a same interface, where the scanning box is used to display a second identification code scanned by a camera of the terminal, and the first identification code is used to store information about the user.

In this implementation of the present specification, the first identification code may be a one-dimensional code, a two-dimensional code, or a multi-dimensional code; and the second identification code may also be a one-dimensional code, a two-dimensional code, or a multi-dimensional code. Specifically, the first identification code may be a Hamming code, a GM code, a QR code, etc.

In this implementation of the present specification, the scanning box and the first identification code can be displayed simultaneously based on a display request submitted by the user. The scanning box can be used to implement the "scanning" mode, and the first identification code can be used to implement the "scanned" mode. As such, the scanning box and the first identification code are displayed on the same interface, both the "scanning" mode and the "scanned" mode can be implemented successfully implemented, and the user does not need to switch between the "scanning" mode and the "scanned" mode, thereby improving the user experience and saving time.

In this implementation of the present specification, "first" and "second" described are merely used to distinguish between identification codes.

In the method shown in FIG. 1, a scanning box and a first identification code can be displayed on a same interface based on a display request of a user. Therefore, a display interface generated by using the method provided in the implementations of the present specification can realize that after a user clicks to invoke a same interface, the interface not only can be used as a scanning device to identify another identification code, but also can be used as a display interface to display an identification code for being scanned and identified by another device. The method provided in this implementation of the present specification integrates the scanning mode and the scanned mode to form an integrated mode, which can support subsequent operations in the two modes without prior judgment or selection by the user, and can greatly improve operation convenience of users in a scenario in which an identification code is used.

Based on the method shown in FIG. 1, an implementation of the present specification further provides some specific methods for implementing the method, which are described below.

Optionally, controlling, based on the display request, a display screen of the terminal to display a scanning box and a first identification code on a same interface specifically includes: controlling the display screen of the terminal to display the scanning box in a first display area; and controlling the display screen of the terminal to display a first identification code in a second display area, where the second display area does not overlap the first display area.

In some specific implementations, the display area is divided on the display for better displaying the scanning box and the first identification code. A scanning box is displayed in the first display area, and the first identification code is displayed in the second display area. Further, when the display screen of the terminal is controlled to display the scanning box and the first identification code, the scanning box and the first identification code may not overlap.

Figure 2:
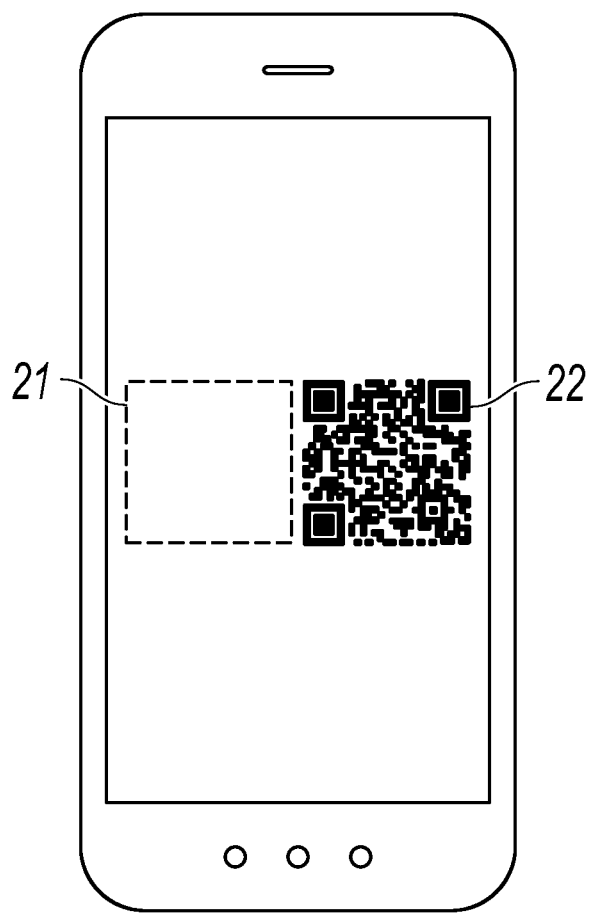
FIG. 2 is a schematic diagram illustrating an interactive interface displayed by using the display method according to an implementation of the present specification.

FIG. 2 is another schematic diagram illustrating an interactive interface displayed by using the display method according to an implementation of the present specification. As shown in FIG. 2, a scanning box 21 and a first identification code 22 are displayed in the middle of the display screen, the first identification code 22 is a two-dimensional code, and the scanning box 21 and the first identification code 22 do not overlap. In display mode provided in FIG. 2, for the "scanning" mode or the "scanned" mode, only the size of the scanning box or the first identification code is reduced, but both the scanning box and the first identification code are displayed in the middle of the display screen, which better caters to the user's behavior habits and improves the user experience.

Figure 3:
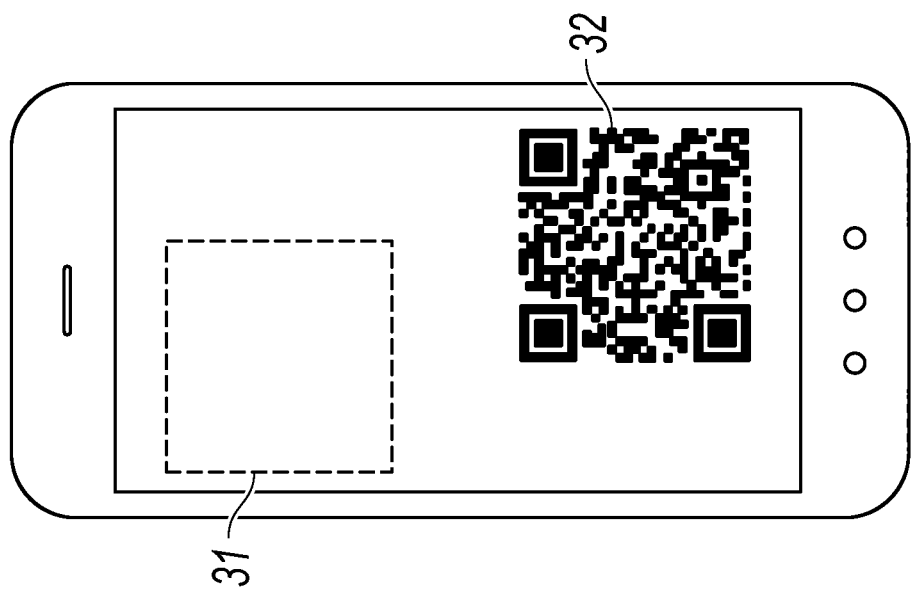
FIG. 3 is another schematic diagram illustrating an interactive interface displayed by using the display method according to an implementation of the present specification.

FIG. 3 is another schematic diagram illustrating an interactive interface displayed by using the display method according to an implementation of the present specification. As shown in FIG. 3, a scanning box 31 is located in the upper left corner of the display screen, a first identification code 32 is located in the lower right corner of the display screen, and the first identification code 32 is a two-dimensional code. The scanning box 31 and the first identification code 32 do not affect each other. The user can select either of the two modes as needed to complete the operation. Compared with a mode the scanning box and the first identification code are arranged side by side, in the display mode provided in FIG. 3, the display sizes of the scanning box and the first identification code are larger, so that the scanning box can successfully identify the second identification code more easily, the first identification code can be successfully scanned more easily, thereby improving a success rate of identification code recognition.

In some specific implementations, another schematic diagram may be obtained based on FIG. 3. For example, the scanning box and a display area of the first identification code are exchanged; that is, the scanning box is located in the upper left corner of the display screen, and the first identification code is located in the lower right corner of the display screen. In addition, the display area of the scanning box and the display area of the first identification code can be simply moved. For example, the scanning box is located in the upper right corner of the display screen, and the first identification code is located in the lower left corner of the display screen.

In some specific implementations, in addition to controlling the display positions of the scanning box and the display position of the first identification code, the display sizes of the scanning box and the first identification code can also be controlled. For example, the size of the second display area is controlled to be greater than that of the first display area. With this setting, the display size of the first identification code is larger, which facilitates implementation of the "scanned" mode. This setting is suitable for a user who uses the "scanned" mode more often than the "scanning" mode.

Figure 4:
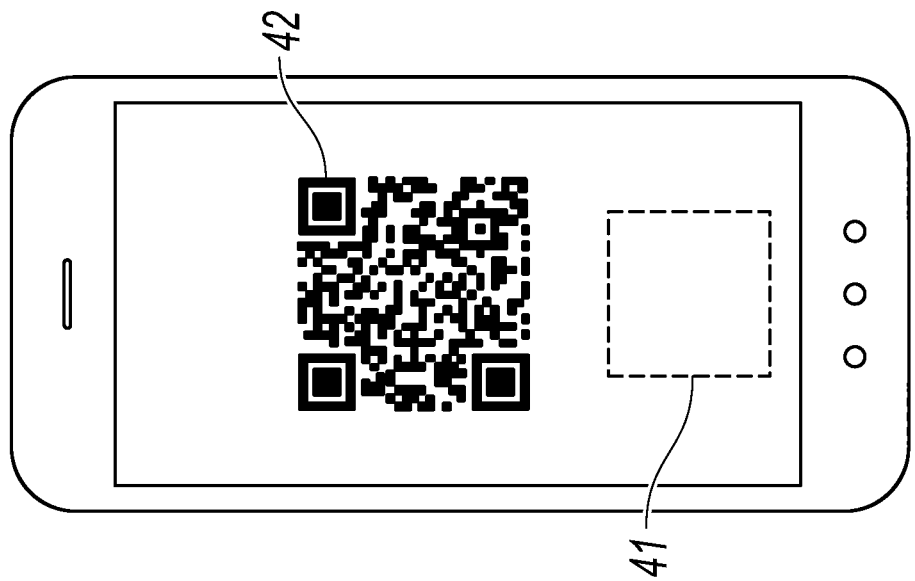
FIG. 4 is another schematic diagram illustrating an interactive interface displayed by using the display method according to an implementation of the present specification.

For example, for a user who uses a social platform for business promotion, to attract more people to follow his social account, in most cases the user will proactively present his two-dimensional code on the social platform for others to scan. In this scenario, the utilization ratio of the "scanned" mode is higher than that of the "scanning" mode, the size of the second display area used to display the first identification code is larger than the size of the first display area used to display the scanning box, and the first identification code can be placed in the middle of the display screen while the scanning box is placed in another position. FIG. 4 is another schematic diagram illustrating an interactive interface displayed by using the display method according to an implementation of the present specification. As shown in FIG. 4, the display size of the first identification code 42 is larger than that of the scanning box 41.

In this implementation of the present specification, the size of the second display area can also be controlled to be larger than the size of the first display area. By setting the display size of the scanning box to be larger than that of the first identification code, the scanning box can be better used for scanning. This setting is suitable for a user who uses the "scanning" mode more often than the "scanned" mode.

In addition, it is worthwhile to note that the display sizes of the scanning box and the first identification code can be adjusted in real time based on historical data of a user, to better suit the usage habits of the user. The client server stores the quantity of operations in the "scanning" mode and the quantity of operations of being "scanned" that are based on the display interface, as well as related payment data or other data; determines the usage habits of the user based on these data; and determine the display sizes of the scanning box and the first identification code based on the usage habits of the user.

Optionally, controlling, based on the display request, a display screen of the terminal to display a scanning box and a first identification code on a same interface specifically includes: controlling the display screen of the terminal to display the scanning box in a first display area; and controlling the display screen of the terminal to display a first identification code in a second display area, where the second display area partially overlaps the first display area.

In this implementation of the present specification, to make better use of the size of the display screen, the first display area for displaying the scanning box and the second display area for displaying the first identification code may also overlap partially or entirely. This setting is intended to make better use of the size of the display screen, and is more suitable for the setting of the display interface that is used in either the "scanning" mode or the "scanned" mode.

Figure 5:
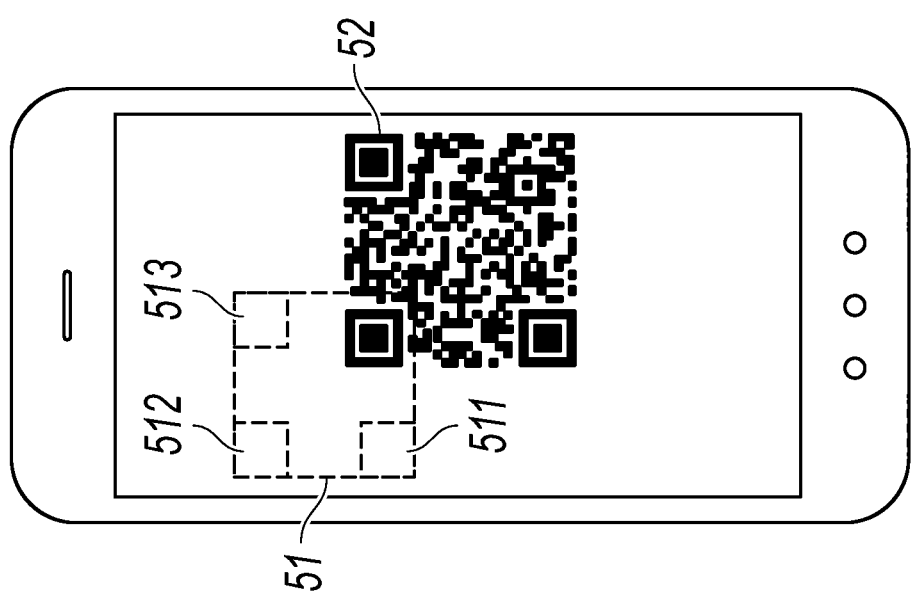
FIG. 5 is a schematic diagram illustrating an interactive interface displayed by using the display method according to an implementation of the present specification.

In this implementation of the present specification, the partially overlapping part may be that the first display area and the second display area do not have an internal inclusion relationship, and there is only an overlapping part on the boundaries of the two display areas, which does not substantially affect the scanning box and the first identification code displayed in the two display areas. FIG. 5 is another schematic diagram illustrating an interactive interface displayed by using the display method according to an implementation of the present specification. As shown in FIG. 5, a scanning box 51 and a first identification code 52 are both square, the first identification code 52 is a two-dimensional code, and the scanning box 51 is used to scan the two-dimensional code. The scanning box 5 includes two-dimensional code positioning areas 511, 512, and 513. Two squares overlap on one of the corners. When the scanning box 51 is used to scan the second identification code that is a two-dimensional code, only three positioning boxes are used. Therefore, when one corner of the square is shielded, scanning of the second identification code is not affected.

In this implementation of the present specification, the partially overlapping part may be that the first display area and the second display area have no internal inclusion relationship. Optionally, the display screen of the terminal is controlled to display a first identifier in a second display area, and the second display area is located inside the first display area. This setting allows the first display area to be positioned in the middle of the display screen, which is more advantageous for scanning by the scanning box. The setting of the first identification code may not affect the function of the scanning box.

Figure 6:
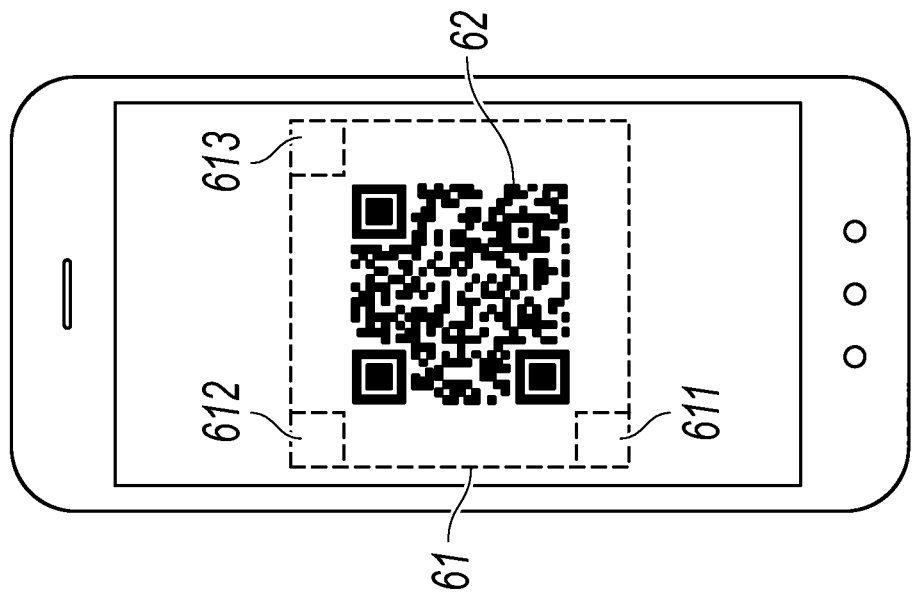
FIG. 6 is another schematic diagram illustrating an interactive interface displayed by using the display method according to an implementation of the present specification.

In some specific implementation manners, when the display screen of the terminal is controlled to display the first identification code in the second display area, the second display area may be further controlled to be located inside the first display area, where the first display area includes three two-dimensional code positioning areas, and the second display area does not overlap any one of the two-dimensional code positioning areas. As shown in FIG. 6, a first identification code 62 is disposed inside a scanning block 61, the first identification code 62 is a two-dimensional code, and the scanning block 61 is configured to scan the two-dimensional code. The two-dimensional code positioning areas 611, 612, and 613 of the scanning box 61 are respectively located in the lower left corner, the upper left corner, and the upper right corner of the scanning box, and the first identification code 62 does not overlap the three two-dimensional code positioning areas. This is advantageous for scanning by the scanning box and does not affect scanning of the first identification code.

Optionally, controlling the display screen of the terminal to display a first identification code in a second display area, where the second display area partially overlaps the first display area specifically includes: controlling the display screen of the terminal to display the first identification code in the second display area, where the second display area entirely overlaps the first display area.

In some specific implementations, the present disclosure can further control the first display area and the second display area to overlap, so that the two functions are combined into a display area. As such, the user is not aware of the operation mode ("scanning" or "scanned") of the display interface, and the user experience is improved.

Figure 7:
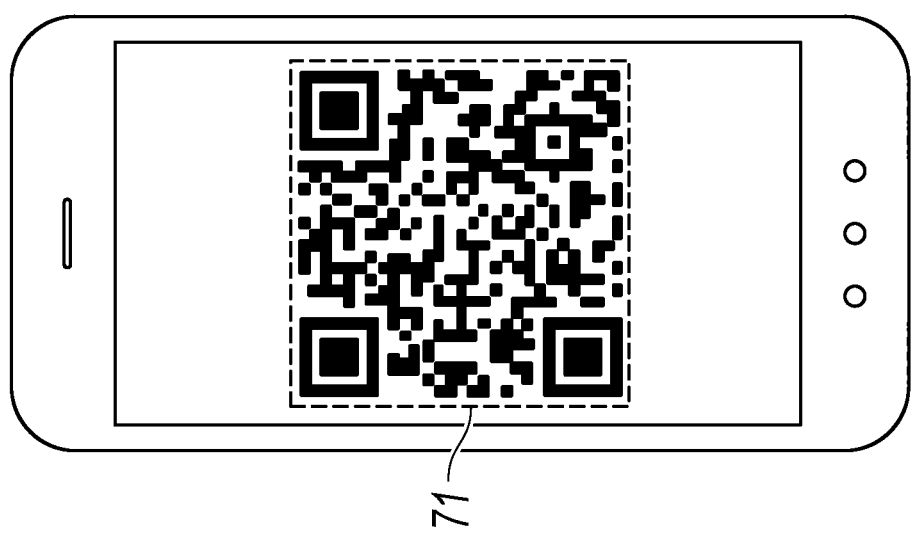
FIG. 7 is another schematic diagram illustrating an interactive interface displayed by using the display method according to an implementation of the present specification.

In this implementation of the present specification, when the first display area overlaps the second display area, the problem of low identification code recognition rate due to the combination of the "scanning" mode and the "scanned" mode can be improved using other methods. For example, the first identification code can be controlled to be translucent. In this case, scanning of the second identification code by the scanning box is not affected even if the first identification code and the scanning box entirely overlap. As shown in FIG. 7, the first identification code is a two-dimensional code, and the scanning box is used to scan the two-dimensional code. The first identification code and the scanning box entirely overlap (the reference numeral 71 in the figure represents both the first identification code and the scanning box), where the first identification code is translucent.

In this implementation of the present specification, to make the interface more user-friendly and enable the user to easily scan other two-dimensional codes by using the interface, the first identification code in the scanning box may be set to be translucent, so that the user can easily locate the two-dimensional code to be scanned. However, the transparency of the first identification code cannot be extremely low, otherwise it may be difficult for the scanning device to distinguish the first identification code from a background image in the "scanned" mode.

It is worthwhile to note that the transparency of the first identification code is independent of scanning of the second identification code in the "main scan" mode: Even if the first identification code is set to be opaque, scanning of the second identification code is not affected. However, extremely low transparency may make it difficult for the user to locate the to-be-scanned two-dimensional codes by using the scanning box, which affects the user experience.

Optionally, before controlling, based on the display request, a display screen of the terminal to display a scanning box and a first identification code on a same interface, the method further includes: determining user information corresponding to the display request; and generating the first identification code based on the user information.

In this implementation of the present specification, the user information can include a user name, account information, and/or payment channel information. If the display request corresponds to a social scenario, the user information can include a user name and user name related information such as signature information and a nickname. If the display request corresponds to a payment scenario, the user information can also include payment-related information such as account information and payment channel information. A payment channel can be account balance, bank card information, and account information of a third-party platform.

In this implementation of the present specification, the first identification code is generated based on the user information. In different application scenarios, the first identification code includes different information. For example, the information represented by the first identification code may be a business card or account information used for payment. Because the display request may vary with an application scenario, the process of generating the first identification code based on the display request may vary accordingly. In a payment scenario, a payment code is generated based on the user information in the display request. In a social scenario, a two-dimensional code business card is generated based on the user information in the display request.

Figure 8:
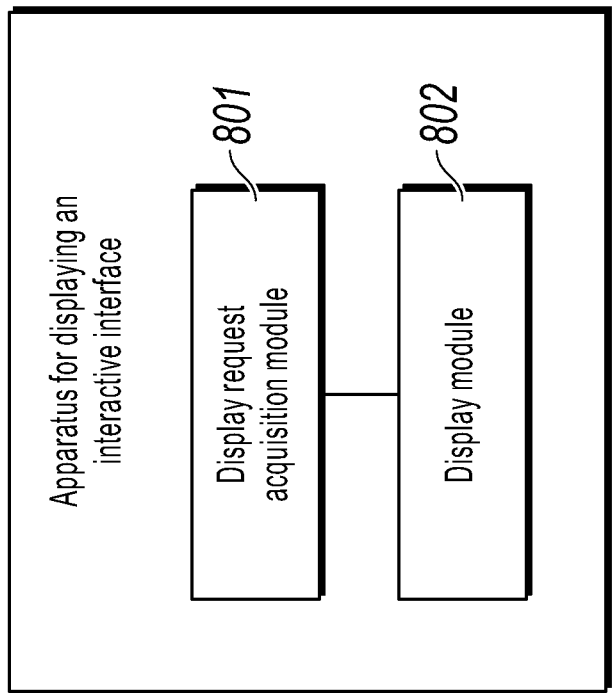
FIG. 8 is a schematic structural diagram illustrating an apparatus for displaying an interactive interface corresponding to FIG. 1, according to an implementation of the present specification.

Based on the same idea, an implementation of the present specification further provides an apparatus corresponding to the previous method. FIG. 8 is a schematic structural diagram illustrating an apparatus for displaying an interactive interface corresponding to FIG. 8, according to an implementation of the present specification. As shown in FIG. 8, the apparatus can include: a display request acquisition module 801, configured to obtain an interactive interface display request that is submitted by a user and sent by a terminal; and a display module 802, configured to control, based on the display request, a display screen of the terminal to display a scanning box and a first identification code on a same interface, where the scanning box is used to display a second identification code scanned by a camera of the terminal, and the first identification code is used to store information about the user.

According to the apparatus for displaying an interactive interface provided in the implementations of the present specification, a scanning box and a first identification code can be displayed on a same interface based on a display request of a user. Therefore, a display interface generated by using the apparatus provided in the implementations of the present specification can realize that after a user clicks to invoke a same interface, the interface not only can be used as a scanning device to identify another identification code, but also can be used as a display interface to display an identification code for being scanned and identified by another device. The apparatus provided in the implementations of the present specification integrates the scanning mode and the scanned mode to form an integrated mode, which can support subsequent operations in the two modes without prior judgment or selection by the user, and can greatly improve operation convenience of users in a scenario in which an identification code is used.

Optionally, the display module 802 can specifically include: a scanning box display unit, configured to control the display screen of the terminal to display the scanning box in a first display area; and a first identification code display unit, configured to control the display screen of the terminal to display a first identification code in a second display area, where the second display area does not overlap the first display area.

Optionally, the display module 802 can further include: a control unit, configured to control the size of the second display area to be larger than that of the first display area.

Optionally, the display module 802 can specifically include: a scanning box display unit, configured to control the display screen of the terminal to display the scanning box in a first display area; and a first identification code display unit, configured to control the display screen of the terminal to display a first identification code in a second display area, where the second display area partially overlaps the first display area.

Optionally, the first identification code display unit can be specifically configured to: when the second identification code is a two-dimensional code, control the display screen of the terminal to display the first identification code in the second display area, where the first display area includes three two-dimensional code positioning areas, and the second display area does not overlap any one of the two-dimensional code positioning areas.

Optionally, the first identifier display unit can be specifically configured to control the display screen of the terminal to display the first identification code in the second display area, where the second display area entirely overlaps the first display area.

Optionally, the display module 802 can further include: a second control unit, configured to control the first identification code to be translucent.

Optionally, in addition to the display module 802, the apparatus further includes: a user information determining module, configured to determine user information corresponding to the display request; and a first identification code generation module, configured to generate the first identification code based on the user information.

Optionally, the user information includes a user name, account information, and/or payment channel information.

Based on the same idea, an implementation of the present specification further provides a device corresponding to the previous method.

Figure 9:
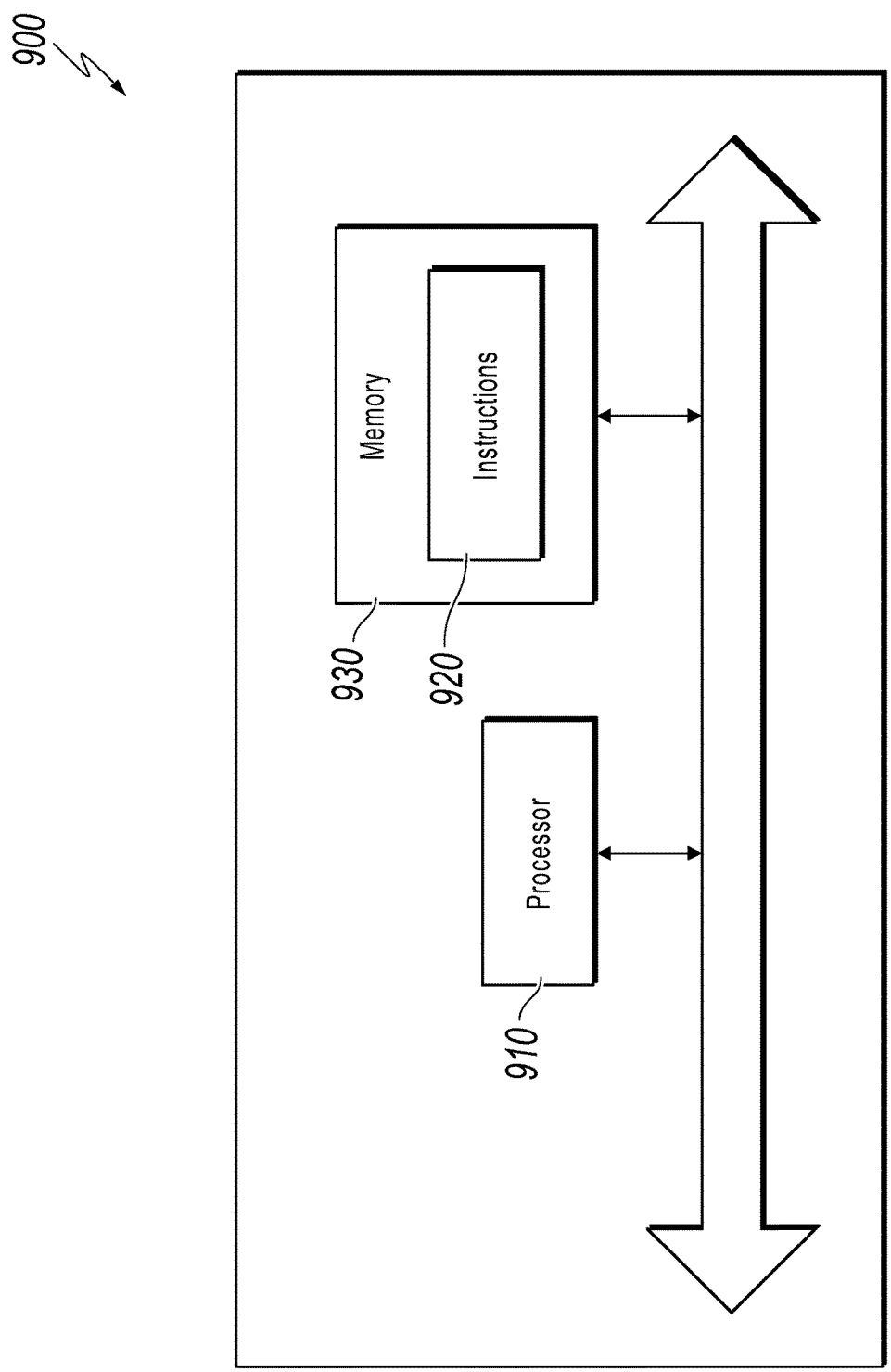
FIG. 9 is a schematic structural diagram illustrating a device for displaying an interactive interface corresponding to FIG. 1, according to an implementation of the present specification.

FIG. 9 is a schematic structural diagram illustrating a device for displaying an interactive interface corresponding to FIG. 1, according to an implementation of the present specification. As shown in FIG. 9, the device 900 can include: at least one processor 910; and a memory 930 communicatively connected to the at least one processor; where the memory 930 stores instructions 920 that can be executed by the at least one processor 910, and the instructions 920 are executed by the at least one processor 910 to enable the at least one processor 910 to: obtain an interactive interface display request that is submitted by a user and sent by a terminal; and control, based on the display request, a display screen of the terminal to display a scanning box and a first identification code on a same interface, where the scanning box is used to display a second identification code scanned by a camera of the terminal, and the first identification code is used to store information about the user.

According to the device for displaying an interactive interface provided in the implementations of the present specification, a scanning box and a first identification code can be displayed on a same interface based on a display request of a user. Therefore, a display interface generated by using the device provided in the implementations of the present specification can realize that after a user clicks to invoke a same interface, the interface not only can be used as a scanning device to identify another identification code, but also can be used as a display interface to display an identification code for being scanned and identified by another device. The device provided in the implementations of the present specification integrates the scanning mode and the scanned mode to form an integrated mode, which can support subsequent operations in the two modes without prior judgment or selection by the user, and can greatly improve operation convenience of users in a scenario in which an identification code is used.

In the 1990s, whether technology improvement is hardware improvement (for example, improvement of a circuit structure, such as a diode, a transistor, or a switch) or software improvement (improvement of a method procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Certainly, functions of the units may be implemented in the same or different software and/or hardware when the present specification is implemented.

A person skilled in the art should understand that the implementations of the present specification may be provided as methods, systems, or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification is described with reference to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific manner, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is worthwhile to note that terms "include", "comprise" or any other variant is intended to cover non-exclusive inclusion, so that processes, methods, products or devices that include a series of elements include not only those elements but also other elements that are not explicitly listed, or elements inherent in such processes, methods, products or devices. An element described by "includes a . . . " further includes, without more constraints, another identical element in the process, method, product, or device that includes the element.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

It is worthwhile to note that the implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The described descriptions are merely examples of the present specification and are not intended to limit the present application. For a person skilled in the art, the present application may be subject to various modifications and variations. Any modification, equivalent replacement or improvement made within spirit and principles of the present application shall be included in claims of the present application.

What is claimed is:

1. A computer-implemented method, comprising:
   obtaining, by an application client executing on a terminal, a display request; and
   controlling, based on the display request, a display screen of the terminal to simultaneously display a camera view from a camera of the terminal and a first identification code in an interface,
   wherein the first identification code is at least partially overlapping with the camera view,
   wherein the first identification code is displayed partially transparently,
   wherein the first identification code stores information corresponding to a user of the terminal, and
   wherein a second identification code included in the camera view is usable by the terminal to perform operations based on the second identification code.

2. The computer-implemented method of claim 1, wherein controlling the display screen comprises:
   based on historical usage data of the user, controlling a size of the first identification code to be larger than a size of the camera view.

3. The computer-implemented method of claim 1, wherein the second identification code is a two-dimensional code, wherein the camera view is rectangular, and wherein the first identification code is displayed at least a defined distance away from each of three corners of the camera view.

4. The computer-implemented method of claim 1, wherein the first identification code entirely overlaps the camera view.

5. The computer-implemented method of claim 1, wherein the information corresponding to the user of the terminal comprises payment information.

6. A non-transitory, computer-readable medium storing one or more instructions executable by a computer system to perform operations comprising:
   obtaining, by an application client executing on a terminal, a display request; and
   controlling, based on the display request, a display screen of the terminal to simultaneously display a camera view from a camera of the terminal and a first identification code in an interface,
   wherein the first identification code is at least partially overlapping with the camera view,
   wherein the first identification code is displayed partially transparently,
   wherein the first identification code stores information corresponding to a user of the terminal, and
   wherein a second identification code included in the camera view is usable by the terminal to perform operations based on the second identification code.

7. The computer-readable medium of claim 6, wherein controlling the display screen comprises:
   based on historical usage data of the user, controlling a size of the first identification code to be larger than a size of the camera view.

8. The computer-readable medium of claim 6, wherein the second identification code is a two-dimensional code, wherein the camera view is rectangular, and wherein the first identification code is displayed at least a defined distance away from each of three corners of the camera view.

9. The computer-readable medium of claim 6, wherein the first identification code entirely overlaps the camera view.

10. The computer-readable medium of claim 6, wherein the information corresponding to the user of the terminal comprises payment information.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    obtaining, by an application client executing on a terminal, a display request; and
    controlling, based on the display request, a display screen of the terminal to simultaneously display a camera view from a camera of the terminal and a first identification code in an interface,
      wherein the first identification code is at least partially overlapping with the camera view,
      wherein the first identification code is displayed partially transparently,
      wherein the first identification code stores information corresponding to a user of the terminal, and
      wherein a second identification code included in the camera view is usable by the terminal to perform operations based on the second identification code.

12. The computer-implemented system of claim 11, wherein controlling the display screen comprises:
    based on historical usage data of the user, controlling a size of the first identification code to be larger than a size of the camera view.

13. The computer-implemented system of claim 11, wherein the second identification code is a two-dimensional code, wherein the camera view is rectangular, and wherein the first identification code is displayed at least a defined distance away from each of three corners of the camera view.

14. The computer-implemented system of claim 11, wherein the information corresponding to the user of the terminal comprises payment information.

15. The computer-implemented system of claim 11, wherein the first identification code entirely overlaps the camera view.

* * * * *